June 4, 1968     H. U. SCHUERCH     3,386,692
PARACHUTE
Filed Dec. 3, 1965
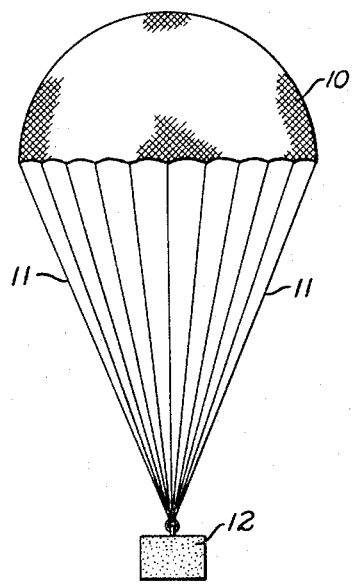
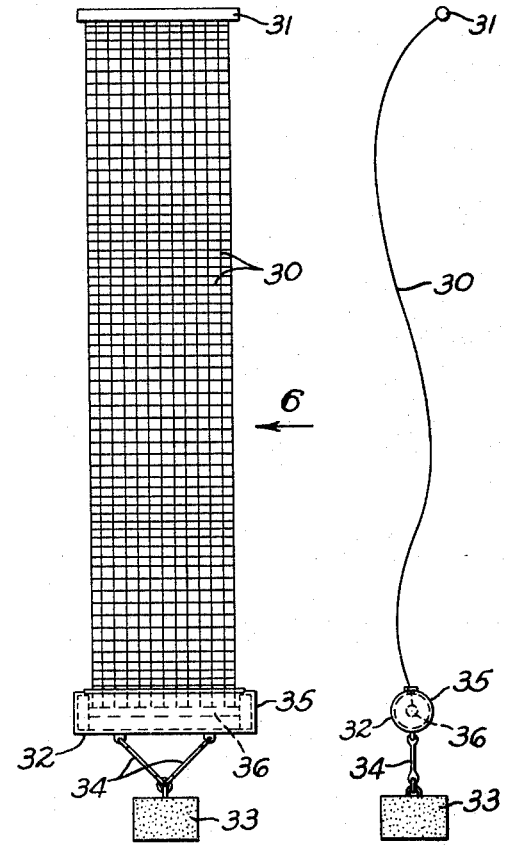
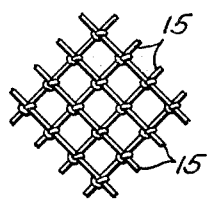
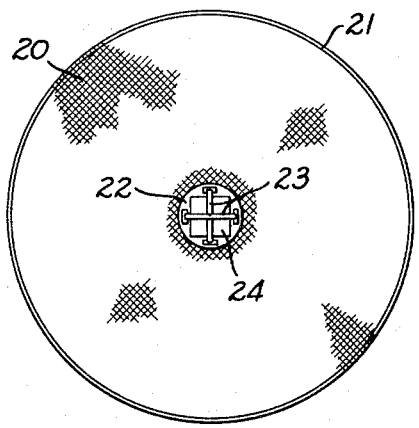
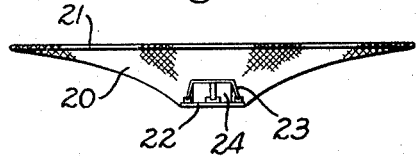
INVENTOR.
HANS U. SCHUERCH
BY HIS ATTORNEYS.
HARRIS, KIECH, RUSSELL & KERN 3,386,692
PARACHUTE
Hans U. Schuerch, Santa Barbara, Calif., assignor to Astro Research Corporation, Santa Barbara, Calif., a corporation of California
Filed Dec. 3, 1965, Ser. No. 511,395
12 Claims. (Cl. 244—138)

ABSTRACT OF THE DISCLOSURE

A parachute having a nearly constant descent rate during a fall from extreme high altitude to the earth's surface and having a friction drag comprising the major portion of the total drag. A parachute with a support member in the form of a canopy or the like and means for coupling a load to the support member, with the support member being in the form of an openwork grill or mesh of fibers or wires or ribbons of a width much less than the spacing between the fibers.

---

This invention relates to parachutes and, in particular, to a new and improved parachute especially adapted for use over a wide altitude range.

Conventional canopy-type parachutes, such as those which are deployed from a package, present an essentially impermeable surface to the air stream. At extremely high altitudes such parachutes may not open promptly and when open fall at a very much higher velocity than when they reach a position close to the ground. The descent velocity of conventional parachutes is dependent upon the density of the surrounding air, which may change by an order of magnitude for each 60,000 feet of altitude increment, from which it will be seen that wide variations in descent velocity are inherent. A need exists for a device that can generate large aerodynamic drag at high altitudes and low atmospheric density while also operating satisfactorily at ground level. A need also exists for a device with a descent velocity varying as little as possible during a fall through large altitudes. It is an object of the invention to provide a parachute which will have these features.

The viscosity of air changes only within relatively small bounds over wide altitude ranges, being dependent only on the temperature of the air. If a parachute could be designed to create a drag that was largely dependent upon air viscosity alone, its descent rate would be substantially constant when dropping from extreme high altitudes to the earth's surface. It is an object of the invention to provide such a parachute.

The drag generated by a conventional parachute consists of two components, first, a pressure drag, which is associated with forces exerted normal to the surface of the body or parachute and, second, a friction drag, which is associated with viscous shear forces tangential to the body or parachute. The relative importance of the two components of drag are expressed by their ratio, commonly referred to as the Reynolds number, $R_e$, and can be expressed $$R_e = \frac{du\rho}{\eta} \quad (1)$$

where:

$d$ is a typical dimension of the body (such as its diameter),
$u$ is the velocity of the body relative to its surrounding air or fluid,
$\rho$ is the density of the surrounding fluid, and
$\eta$ is the viscosity of the surrounding fluid.

Conventional parachutes have high Reynolds numbers.

In contradistinction it is an object of the present invention to provide a parachute in which the Reynolds number is very small so that the friction drag becomes a significant portion of the total drag and preferably the major portion. This is accomplished by making the parachute support member of an open-work nature, preferably of a grill or mesh comprising an array of very fine elements, such as fibers, wires or ribbons, of a width much less than the spacing therebetwen. The particular pattern of these fine elements is not of primary importance so long as they are sufficiently spaced from each other to act as recognizable drag-producing units. In popular terms, the parachute of the invention may have the surface appearance of a veil, hairnet or open-mesh woven fabric in which the mesh size greatly exceeds the filament width.

With a conventional parachute having a high Reynolds number, the total drag can be expressed quite adequately in terms of the pressure forces only, by the equation $$D_\nu = C_{D_p} A_p \frac{\rho u^2}{2} \quad (2)$$

where:

$C_{D_p}$ is the pressure drag coefficient, and
$A_p$ is the cross-sectional or frontal area of the parachute.

It will be apparent that the drag increases with the density of the air, with the square of the velocity relative to the surrounding air, and with the total cross-sectional area of the parachute.

In contradistinction, the parachute of the present invention has a very small Reynolds number, such that the pressure drag may become less significant than the friction drag. The friction drag may be expressed in terms of friction forces only, by the equation $$D_f = C_{D_f} A_f \eta \frac{u}{d_1} \quad (3)$$

where:

$C_{D_f}$ is the friction drag coefficient,
$A_f$ is the area of the support member elements exposed to the fluid, and
$d_1$ is a dimension of a canopy element (such as diameter).

It will be apparent that the friction drag increases linearly with velocity and viscosity.

The area ($A_f$) and the velocity gradient ($u/d_1$) can be made almost indefinitely large, by dividing a given mass of the parachute material into increasingly finer fibers. Thus the drag:mass ratio of the device can be increased, limited only by the minimum diameter or width of filaments that can be practically used. It is an object of this invention to provide a parachute having this advantageous feature.

It should be noted also that if a parachute is deployed at velocities substantially larger than those which correspond to steady-state descent (where the total weight of parachute and load equals the drag), the phenomenon of "inflation shock" occurs. The severity of the inflation shock is measured by the ratio of drag force at initial deployment to weight (or drag at steady-state descent). Referring to Equations 2 and 3, it is seen that this ratio is proportional to the velocity in the case of the parachute of the invention, but proportional to the square of velocity in the case of a conventional parachute. Thus, if the parachute is opened at a velocity of ten times the desired steady-state descent, a conventional parachute will experience an inflation shock of 100 g.'s, while the parachute of the invention will experience a shock of only 10 g.'s. It will thus be apparent that inflation shock is reduced many-fold by use of the invention. It is also an object of the invention to provide a parachute incorporating this feature.

It is a particular object of the invention to provide such a parachute wherein the support member may take a variety of shapes, including the conventional collapsible canopy, a fixed canopy with a rim, a generally vertically disposed strip, or the like.

Other objects, advantages, features and results will more fully appear in the course of the following description. The drawing merely shows and the description merely describes preferred embodiments of the present invention which are given by way of illustration or example.

In the drawing:

FIG. 1 is a side view illustrating one embodiment of the invention in operation;

FIG. 2 is an enlarged fragmentary view of a portion of the canopy of the parachute of FIG. 1;

FIG. 3 is a side view of an alternative embodiment of the invention in operation;

FIG. 4 is a top view of the parachute of FIG. 3;

FIG. 5 is a front view of another alternative embodiment of the invention in operation; and FIG. 6 is a side view of the parachute of FIG. 5.

The parachute of FIG. 1 is generally conventional in appearance, including a support member in the form of a collapsible canopy 10 with a plurality of shroud lines 11 affixed to the edge of the canopy for supporting a load 12. However, the canopy 10 differs from that of the conventional parachute, being in the form of an open-work structure comprising a plurality of elements having a relatively small frontal area and spaced relatively far apart. Typically, the open-work canopy may be a mesh or lattice or grill or similar arrangement and a preferred mesh form is shown in the enlarged fragmentary view of FIG. 2.

The mesh of FIG. 2 is formed of a plurality of filament-like elements 15 which may be interwoven or knotted or otherwise arranged to form a fish-net-like structure. The elements 15 may be in the form of fibers, wires, ribbons, or similar structures. The relatively simple square-type mesh pattern is ordinarily preferred but it is understood that other arrangements of elements, such as parallel or diamond-patterned or hexagonal-patterned or otherwise, may be utilized as desired.

The spacing between the elements forming the open-work canopy should be sufficietly high to prevent choking of fluid flow through the canopy. Expressed in another way, for circular elements the ratio of the space between adjacent elements to the diameter of an element should be at least about four and preferably at least about twenty. With this type of construction, the pressure drag will be smaller than the friction drag produced by the parachute and may be made so low as to be insignificant. That is to say, the Reynolds number will be quite low and should not be more than about 5.0 and preferably not more than about 1.0 for the circular elements.

It has been determined that the objects of the invention can be achieved by selecting the size of the canopy elements and the spacing between the elements such that the canopy has a total drag coefficient based upon the frontal area of the elements of at least 3.5, where the total drag coefficient is defined in the conventional manner as the total drag per unit frontal area of the parachute elements divided by the dynamic pressure of the free stream. This limitation is not dependent upon the particular shape of element utilized.

The drag due to friction should be at least about 30% of the total drag of the parachute and preferably can be higher. In some instances, the frictional drag may be 90% of the total drag, making the pressure drag really insignificant.

The objects can be achieved by constructing the canopy such that the width of a canopy element is equal to or less than about five times the kinematic viscosity (i.e., the viscosity divided by the density) of the air at the desired operating altitude divided by the desired descent velocity, where the width is expressed in feet, the kinematic viscosity in square feet per second, and the velocity in feet per second. For example, consider a man-rated parachute with a desired descent velocity of twenty-five feet per second at sea level in air having a kinematic viscosity of $1.57 \times 10^{-4}$. The elements forming the canopy should have a width (which would be the diameter of a cylindrical element) that is not more than about $.314 \times 10^{-4}$ feet or $.377 \times 10^{-3}$ inches. If the altitude in this example were changed from sea level to 100,000 feet, at which altitude the kinematic viscosity is about $93.2 \times 10^{-4}$, the width of the elements forming the canopy should not be more than about .0223 inch.

In one specific model having a higher descent velocity, such as might be used with an unmanned parachute, a square mesh pattern was utilized with fiber elements approximately .002 inch diameter and spaced ¼ inch apart. The total drag coefficient based on the frontal area of the elements was about 3.6 at sea level, corresponding to a total drag coefficient at 30,000 feet of about 5.

The alternative structure of FIGS. 3 and 4 includes a support member in the form of a canopy 20 fixed in a ring 21 for maintaining the canopy in the deployed position. A load pad 22 is carried in the center of the canopy and includes suitable means such as straps 23 for retaining a load thereon. The canopy 20 may be made in the same manner as the canopy 10 discussed above. In an alternative form, the load may be supported by shroud lines affixed to the ring 21, as in the manner illustrated in FIG. 1.

The alternative structure of FIGS. 5 and 6 includes a support member in the form of a strip 30 which is deployed in a generally vertical position during descent. The strip 30 may be an open-work structure made in the same manner as the canopy 10 discussed above. A spreader bar 31 may be carried at the upper end of the strip 30 for the purpose of maintaining the strip in the spread position. A similar spreader bar may be provided at the lower end but a preferred construction incorporates a roller mechanism 32 which can function as a spreader bar and also provide for rolling the strip in and out. A payload 33 may be supported from the lower spreader bar or roller mechanism by shroud lines 34.

The roller mechanism 32 may be conventional in design and may include a housing 35 with the roller 36 positioned therein. One end of the strip 30 will be fixed to the roller 36. In its simplest form, the roller 36 may rotate freely in the housing 35, with the strip 30 initially completely rolled onto the roller. During descent, the drag forces acting on the upper spreader bar and upper end of the strip will pull the strip out from the roller mechanism.

In an improved form, a drag brake of conventional design may be incorporated in the roller mechanism for limiting the rate at which the strip can be pulled from the roller mechanism. In another improved form, a drive means such as an electric motor may be incorporated in the roller mechanism to provide for rolling in or retracting of the strip as desired, thereby providing means of controlling the descent velocity.

During descent the strip 30 may wave due to the action of the tangential airstream, in the fashion of a fluttering flag. This fluttering or waving action may further increase the drag obtainable with the parachute.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a parachute the combination consisting essentially of: a porous, open-mesh parachute support member, and means for coupling a load to said support member, said support member being in the form of an openwork panel and being formed of elements having a relatively small frontal area, said elements being spaced apart a distance at least about four times the frontal width thereof, said porous support member generating the total drag of the parachute consisting of a pressure drag and a friction drag, the frictional drag on said porous support member, resulting from viscous shear forces of the air stream tangential to said elements, providing a substantial portion of the total drag of the parachute.

2. A parachute as defined in claim 1 wherein the space between said support member elements is at least about twenty times the width of an element.

3. A parachute as defined in claim 1 wherein said support member has a total drag coefficient based on the frontal area of said elements of at least about 3.5.

4. A parachute as defined in claim 1 wherein said support member is formed of a plurality of fiber-like elements each having a width (in feet) equal to or less than about five times the kinematic viscosity of air at the desired operating altitude (in square feet per second) divided by the desired descent velocity (in feet per second).

5. A parachute as defined in claim 1 wherein said support member has a low pressure drag and a high friction drag such that the Reynolds number is not more than about 5.0.

6. A parachute as defined in claim 1 wherein said support member is in the form of a collapsible canopy.

7. A parachute as defined in claim 1 wherein said support member is in the form of a ring having said elements affixed thereto.

8. A parachute as defined in claim 1 wherein said support member is in the form of a strip disposed in a generally vertical position during descent.

9. A parachute as defined in claim 8 including roller means at one end of said strip for rolling said strip thereon, said roller means having drag brake means for limiting the rate at which said strip is unrolled therefrom.

10. A parachute as defined in claim 8 including roller means at one end of said strip for rolling said strip thereon, said roller means having drive means for rolling said strip onto said roller means.

11. A parachute as defined in claim 1 wherein said support member has a friction drag of at least about 30% of the total drag.

12. A parachute as defined in claim 1 wherein said support member is in the form of a laterally disposed substantially rigid frame having said elements affixed thereto.

References Cited

UNITED STATES PATENTS 2,993,667    7/1961    Cushman _____ 244—142

FERGUS S. MIDDLETON, *Primary Examiner.*

MILTON BUCHLER, *Examiner.*

R. A. DORNON, *Assistant Examiner.*